United States Patent
Warrier et al.

(10) Patent No.: US 6,684,256 B1
(45) Date of Patent: Jan. 27, 2004

(54) ROUTING METHOD FOR MOBILE WIRELESS NODES HAVING OVERLAPPING INTERNET PROTOCOL HOME ADDRESSES

(75) Inventors: Chandra Warrier, Schaumburg, IL (US); Yingchun Xu, Buffalo Grove, IL (US)

(73) Assignee: UTStarcom, Inc., Alameda, CA (US)

( * ) Notice: Subject to any disclaimer, the term of this patent is extended or adjusted under 35 U.S.C. 154(b) by 0 days.

(21) Appl. No.: 09/491,751

(22) Filed: Jan. 27, 2000

(51) Int. Cl.[7] ............................................. G06F 15/16
(52) U.S. Cl. ....................... 709/238; 702/245; 702/249
(58) Field of Search ................................ 709/217, 218, 709/223, 225, 226, 229, 238, 245, 249; 370/338, 349, 389, 392, 401; 455/433

(56) References Cited

U.S. PATENT DOCUMENTS

| | | | | |
|---|---|---|---|---|
| 5,528,595 | A | | 6/1996 | Walsh et al. .............. 370/85.13 |
| 6,160,804 | A | * | 12/2000 | Ahmed et al. ............... 370/349 |
| 6,163,843 | A | * | 12/2000 | Inoue et al. ................. 713/201 |
| 6,167,513 | A | * | 12/2000 | Inoue et al. ................. 713/150 |
| 6,195,705 | B1 | * | 2/2001 | Leung ......................... 709/245 |
| 6,240,089 | B1 | * | 5/2001 | Okanoue et al. ............ 370/390 |
| 6,374,108 | B1 | * | 4/2002 | Jakobsen et al. ............ 455/432 |
| 6,407,988 | B1 | * | 6/2002 | Agraharam et al. ........ 370/328 |
| 6,424,639 | B1 | * | 7/2002 | Lioy et al. ................... 370/338 |
| 6,430,698 | B1 | * | 8/2002 | Khalil et al. ..................... 714/4 |
| 6,445,922 | B1 | * | 9/2002 | Hiller et al. ................. 455/433 |
| 6,452,920 | B1 | * | 9/2002 | Comstock .................... 370/349 |
| 6,466,571 | B1 | * | 10/2002 | Dynarski et al. ............ 370/352 |
| 6,466,964 | B1 | * | 10/2002 | Leung et al. ................ 709/202 |
| 6,501,746 | B1 | * | 12/2002 | Leung ......................... 370/338 |
| 6,571,289 | B1 | * | 5/2003 | Montenegro ................ 709/227 |

OTHER PUBLICATIONS

C. Perkins, Request for Comments 2002 (Oct. 1996).

* cited by examiner

Primary Examiner—Glenton B. Burgess
Assistant Examiner—Kimberly Flynn
(74) Attorney, Agent, or Firm—McDonnell Boehnen Hulbert & Berghoff

(57) ABSTRACT

In mobile IP wireless data networking, methods are described for correctly routing packets through a foreign agent to or from wireless nodes where the wireless nodes have the same home network IP address. Instead of using normal IP routing, the foreign agent uniquely identifies the wireless node's home network IP address and home agent IP address with a PPP link address associated with a PPP link between the foreign agent and the wireless node. This association between PPP link addresses, home agent IP addresses, and home network IP addresses, is preferably implemented in software as a table stored in the foreign agent. The routing of packets through the foreign agent to the mobile nodes is performed by reference to the table. The table allows the foreign agent to correctly and efficiently route packets in the situation where multiple wireless nodes are registered with the foreign agent, but more than one of the wireless nodes have the same home network IP address.

15 Claims, 4 Drawing Sheets

Fig. 2

TUNNEL TABLE ~50

| PPP LINK ADDRESS | HOME AGENT IP ADDRESS | HOME IP ADDRESS |
|---|---|---|
| 60→ x1.x2.x3.2 | y1.y2.y3.4 | z1.z2.z3.4 |
| 62→ x4.x5.x6.3 | p1.p2.p3.6 | z1.z2.z3.4 |
| x7.x8.x9.1 | g1.g2.g3.5 | z1.z2.z3.4 |
| x2.x1.x6.5 | h1.h2.h3.2 | z1.z4.z7.6 |
| ... | ... | ... |

ROUTING METHOD FOR MOBILE WIRELESS NODES HAVING OVERLAPPING INTERNET PROTOCOL HOME ADDRESSES

BACKGROUND OF THE INVENTION

A. Field of the Invention

This invention relates to the subject of mobile Internet Protocol ("IP") data networking.

B. Description of Related Art

Public packet switched networks can be used to carry traffic to and from a mobile communications device, such as a laptop computer or personal digital assistant equipped with a cellular telephone modem. The basic architecture of mobile IP data networking is known in the art and described in several publications, including the Request for Comments document RFC 2002 (1996) and in the textbook of Charles E. Perkins, *Mobile IP Design Principles and Practices*, Addison-Wesley Wireless Communications Series (1998), the contents of both of which are incorporated by reference herein.

Basically, in Mobile IP communication, a wireless mobile node communicates with a terminal on an IP network by means of a foreign agent and a home agent. Typically, foreign agent functionality is incorporated into a network access server chassis located on a mobile node's visited network. The foreign agent provides routing services for the mobile node while it is registered with the foreign agent. A Point-to-Point Protocol (PPP) session is established between the mobile node and the foreign agent. The foreign agent de-tunnels and delivers datagrams to the mobile node that were tunneled by the mobile node's home agent.

The home agent is usually a router on a mobile node's home network that tunnels datagrams for delivery to the mobile node via the foreign agent when the mobile node is away from home. The home agent maintains current location information for the mobile node, through a variety of possible mechanisms, such as described in the patent application of Richard J. Dynarski, et al., "Dynamic Allocation of Wireless Mobile Nodes Over an Internet Protocol (IP) Network", serial no. 09/233,381, which is incorporated by reference herein. When multiple home agents are handling calls for multiple mobile nodes simultaneously, the home agents are providing, in essence, a service analogous to virtual private network services. Each mobile node is typically associated with a separate home network. The routing path from that home network, through the home agent, to the foreign agent and mobile node is like a virtual private network for the mobile node.

The situation can arise in which two mobile nodes are simultaneously registered with a foreign agent, and have established a PPP session with the foreign agent, but the two mobile nodes have the same home network IP address. In a typical prior art foreign agent implementations the overlapping IP addresses will cause an IP routing failure, since more than one routing table entry could have the same network address associated with different PPP links. This overlapping IP address for both mobile nodes could be a consequence of the home network assigning the same IP address to the mobile node, either a priori or during the mobile IP registration process.

Accordingly, there is a need in the art for a method for handling overlapping IP address pools in a foreign agent. The present invention solves that need and provides methods by which a foreign agent can correctly route packets to a from any number of mobile nodes that are simultaneously registered with the foreign agent but have the same home network IP address.

SUMMARY OF THE INVENTION

In a first aspect, a method is provided for routing a data packet through a foreign agent to a wireless node. The method is specifically designed to handle the situation where multiple wireless nodes are registered with the foreign agent but have the same home network IP addresses. The method begins by receiving a data packet at the foreign agent from a home agent associated with wireless node. The foreign agent uniquely associates a home Internet Protocol (IP) address and a home agent IP address contained in the data packet with a Point-to-Point Protocol (PPP) link address. The PPP link address is associated with a PPP link previously established between the foreign agent and the wireless node. This association is preferably implemented in a software table. The foreign agent forwards the data packet through the foreign agent to the PPP link (with the addressing done by reference to the table) for transmission to the wireless node.

In a preferred implementation, the foreign agent maintains a table mapping PPP link addresses to unique pairs of home IP addresses and home agent IP addresses. The step of associating the incoming packet from the home agent is performed automatically in the foreign agent by reference to the table. Since each wireless node having the same home network IP address will have a different home agent, multiple wireless nodes having the same home IP addresses but different home agent IP address may be distinguished from each other in the table and the foreign agent can correctly identify the PPP link to forward the packet to the proper wireless node.

In the reverse direction, the foreign agent receives packets from the wireless nodes, and some of the wireless nodes may have the same home network IP addresses. However, the wireless nodes having the same home network IP address will be associated with a separate PPP link. Be reference to the table, the foreign agent can determine which home agent to forward the packet to, since the home agents are uniquely identified with a home agent IP address and a PPP link address associated with the packet received from the wireless node. The result is that in both directions, the foreign agent can handle the situation where multiple wireless nodes are active in the foreign agent but have the same home network IP address. If conventional IP routing methods were performed, this would not be possible.

These and other features and aspects of the invention will be described in further detail in the following specification.

BRIEF DESCRIPTION OF THE DRAWINGS

FIG. 2 is a illustration of a portion of the table that is maintained in the foreign agent that is used to route packets to the wireless nodes and to the home agents in accordance with a principal aspect of the invention.

DETAILED DESCRIPTION OF THE PREFERRED EMBODIMENT OF THE INVENTION

Overview of Representative Network System for Mobile IP Nodes

Figure 1:
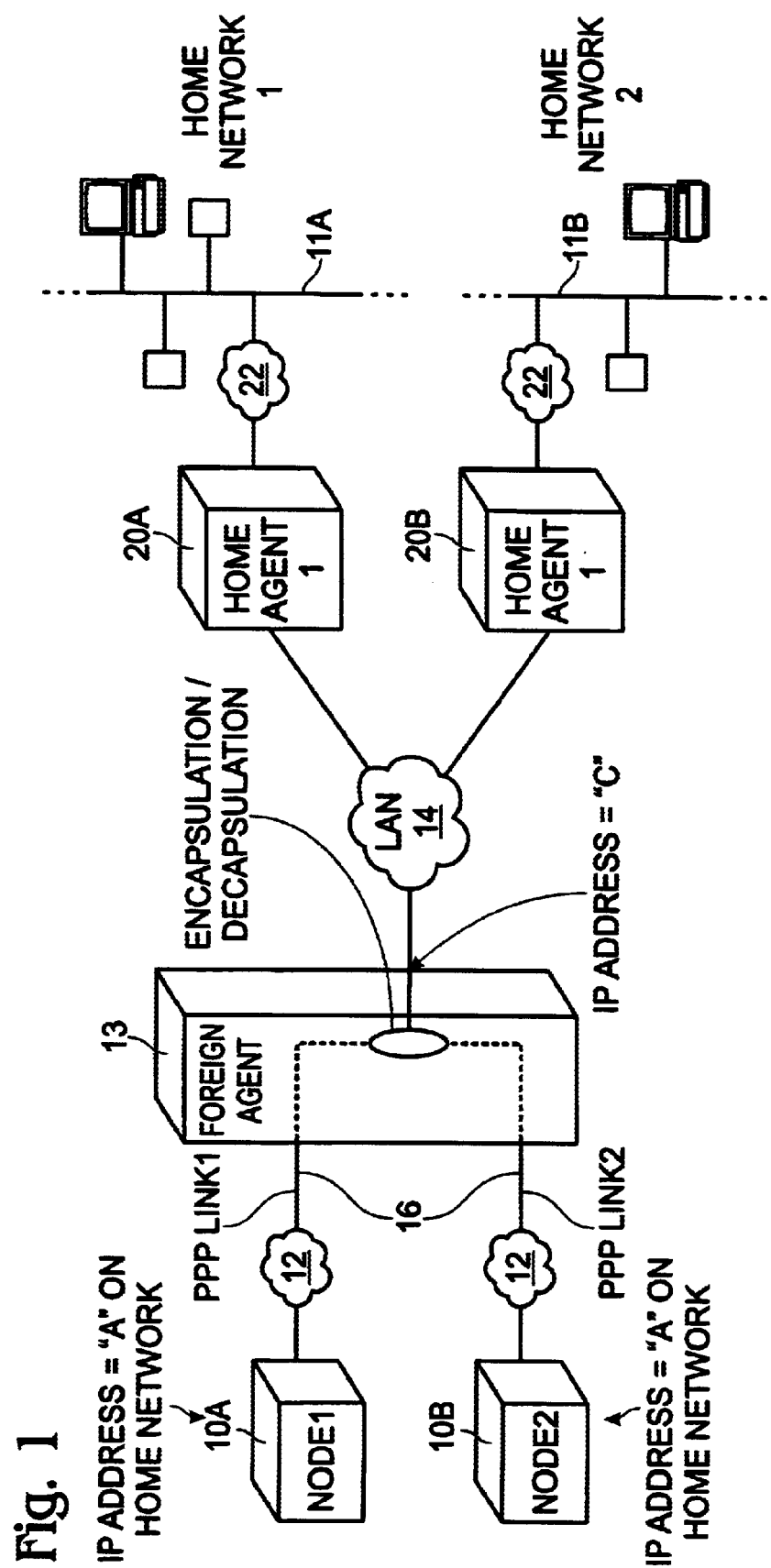
FIG. 1 is a schematic diagram showing the basic architecture for providing mobile IP networking services for a plurality of wireless nodes, two of which happen to have the same home network IP address.

Referring now to FIG. 1, a basic architecture for providing IP networking services for a group of mobile nodes is shown schematically. In the example of FIG. 1, two wireless users, designated 10A and 10B, exchange IP packets with host computers on their home networks 11A and 11B, respectively. The wireless users or nodes send and receive IP packets by means of a radio access network 12 (the details of which are not important) and a PPP link 16 established with a remote access server 13 functioning as a mobile IP foreign agent (also known in the art as an IWU/FA or Interworking Unit/Foreign Agent). The foreign agent 13 has an IP address (e.g., "C") which is used for tunneling data packets from the home agents 20 to the foreign agent in accordance with the mobile IP protocol.

The foreign agent 13 is on a network 14 maintained by a provider of mobile IP service, such as a wireless communications company or other suitable entity. The foreign agent 13 may be of the general type of device described in the patent of Dale M. Walsh et al., U.S. Pat. No. 5,528,595 and assigned to the assignee of the present invention. Such network access servers are available from companies such as 3Com Corporation and Lucent Technologies. Basically, the network access server/foreign agent implements foreign agent functions as specified by RFC 2002 and provide access to an IP local or wide area network 14 for the mobile nodes.

IP packets for the mobile devices are tunneled to the foreign agent 13 by a home agent in accordance with the Mobile IP protocol. In the example of FIG. 1, a home agent 20A for mobile node 10A is connected by one more intermediate networks 22 to the home network 11A for the mobile wireless node 10A. Similarly, the IP packets from the home network 11B are transmitted over one or more intermediate networks to the home agent 20B, where they are tunneled to the foreign agent 13 for transmission to the mobile wireless node 10B.

Each home agent 20 typically comprises a router with an interface to the local area network 14 and a wide area network interface that connects the home agent to intermediate networks 22 (which may be an Asynchronous Transfer Mode network, frame relay network, or other type of network). The backhaul network 22 is in turn connected via suitable routers to the individual home networks 11A, 11B of the mobile nodes 10A, 10B respectively.

In the present example, mobile nodes 10A and 10B are assigned the same home IP address, say "A". Both of them are connected to the same foreign agent and have the same mobile IP foreign agent care-of-address of "C" (IP address of foreign agent 13), for tunneling purposes. Ideally, the foreign agent 13 tunnels traffic from the mobile node 10A to the home agent 20A, which in turn routes it via intermediate networks to the home network 11A for the mobile node. Similarly, the foreign agent 13 tunnels traffic from the mobile node 10B to the home agent 20B, which in turn routes it via intermediate networks to the home network 11B for the mobile node.

The problem with this situation is that, with both mobile nodes having the same IP addresses on their home networks, if the foreign agent 13 uses conventional IP routing schemes (as is the case for remote access servers), it would not be able to properly route the IP packets from the mobile nodes to the home agents. Similarly, in the opposite direction the foreign agent 13 would not be able to determine which mobile node 10A or 10B the packet is intended for since the mobile nodes have the same home network IP address.

The present invention addresses this problem. Instead of using conventional IP routing, a preferred embodiment of the invention associates the address of the PPP link 16 between the mobile node and the foreign agent to the IP tunneling information needed to correctly route the packets to the proper home agent. In the direction of home agent to mobile node, the foreign agent receives a data packet associated with one of the wireless nodes from the respective home agent. The foreign agent maintains a tunneling table associating a home network IP address and a home agent IP address contained in the data packet with a Point-to-Point Protocol (PPP) link address in the foreign agent. The PPP link address identifies the PPP link that is established between the foreign agent and the wireless node. Since the home agent IP address and home network IP address form a unique pair or set of information, they can be used to uniquely, and correctly, identify the associated PPP link for the packet and accordingly can be used to tie any IP packets from the foreign agent to and from the mobile node via the table. The foreign agent forwards the data packet to the PPP link for transmission to the mobile node by reference to the table.

Figure 3:
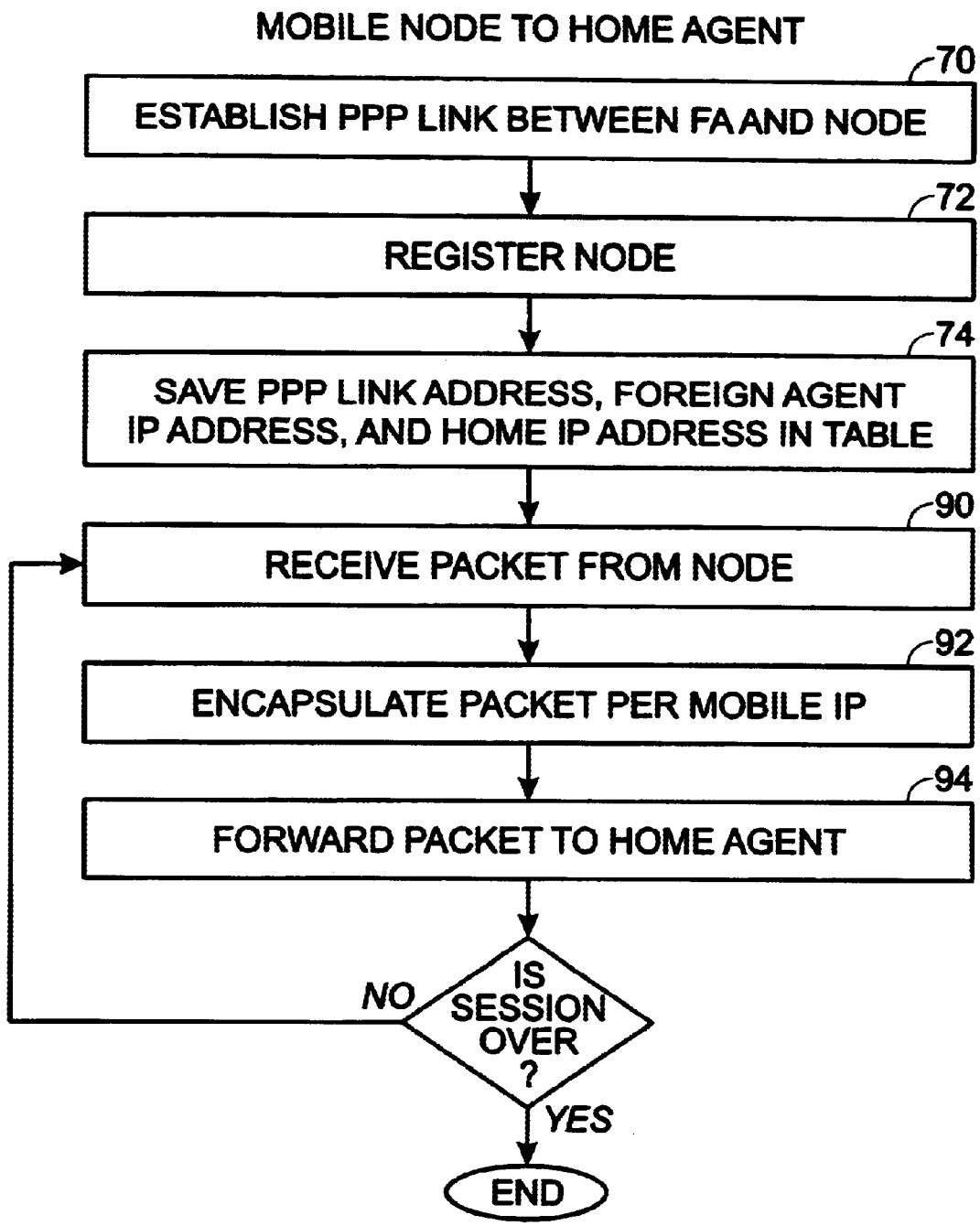
FIG. 3 is a flow diagram illustrating the method performed by the foreign agent for forwarding of packets from mobile nodes to their respective home agent.
Figure 4:
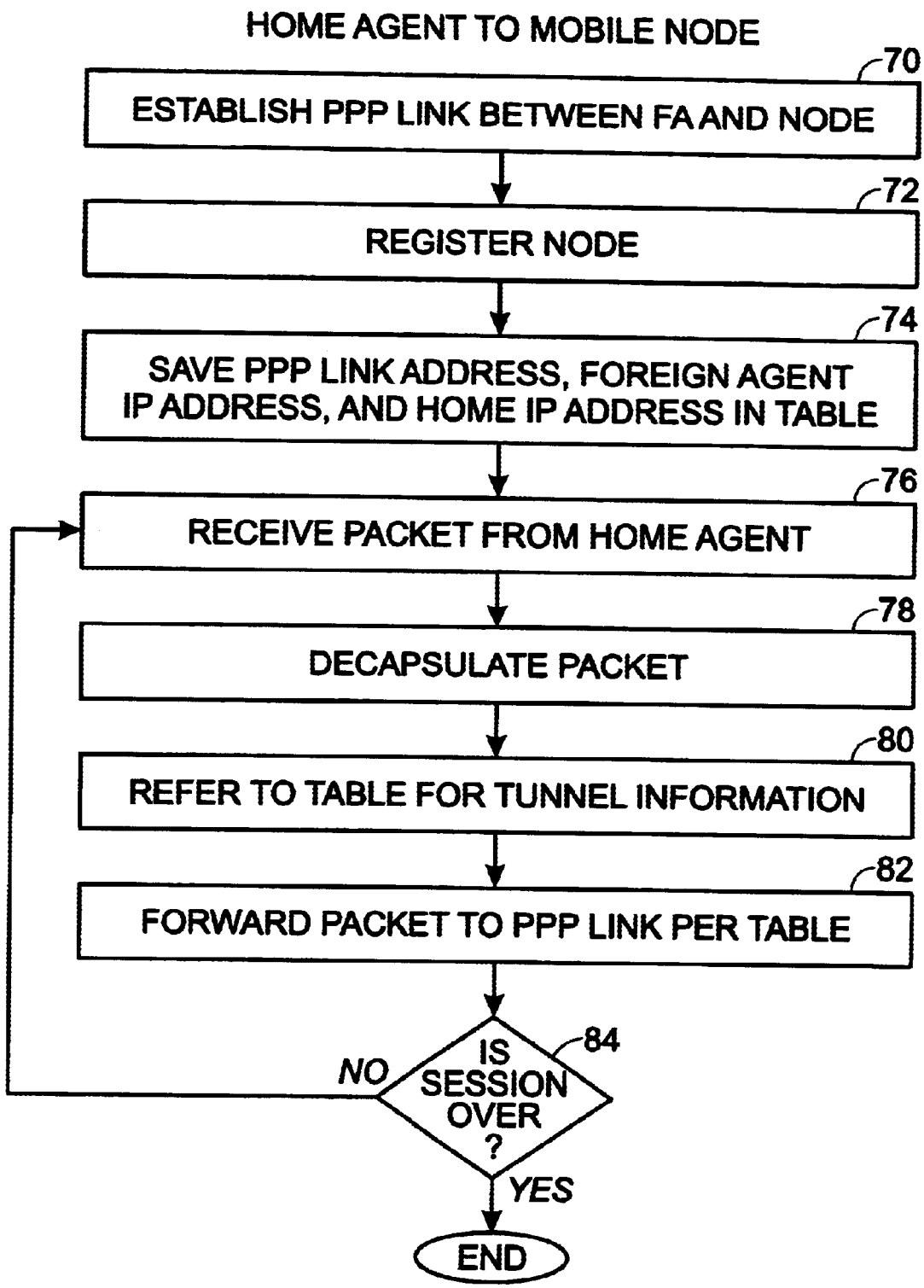
FIG. 4 is a flow diagram illustrating the method implemented in the foreign agent for forwarding of packets from the home agent to the mobile nodes.

FIG. 2 is an illustration of a representative tunneling table 50 maintained in software by the foreign agent and used to correctly route packets to and from the mobile nodes when the overlapping IP pool situation is presented. FIGS. 3 and 4 illustrate the method in detail.

With reference to FIGS. 2–4, the process begins at step 70 when a PPP link or session is established between the mobile node 10A or 10B and the foreign agent 13. During establishment of the session and negotiation of protocols, such as IP Control Protocol (IPCP), the foreign agent will allow the same IP address assignment for the mobile node, that is, it will disregard the fact that another mobile node is registered with the foreign agent with the same IP address.

Once the PPP link negotiation is completed, the foreign agent will perform mobile IP discovery procedures and wait for registration request messages from the mobile node. When a registration request message is received the foreign agent proceeds with registering with mobile node, indicated in step 72.

Once registration of the mobile node is completed, the home network IP address, home agent IP address and PPP link addresses are saved in a tunneling table, as indicate at step 74, such as the table illustrated in FIG. 2. The tunneling table can only be created after a successful registration of the mobile node because a mobile client could request dynamically a home IP address assignment at the network layer.

In the table of FIG. 2, the numbers $x_1.x_2.x_3.2$, $y_1.y_2.y_3.4$, $z_1.z_2.z_3.4$, $g_1.g_2.g_3.5$ etc. are intended to simply represent some particular IP addresses that are assigned to the PPP link in the foreign agent, the home agent, and the mobile node on the home network. The home agent IP address (e.g., $p_1.p_2.p_3.6$) and home network IP address (e.g. $z_1.z_2.z_3.4$) form a unique pair of identifiers and provide a unique PPP link address. Note that the first two entries 60 and 62 in the table 50 have the same home network IP address ($z_1.z_2.z_3.4$), but, since they have different home agent IP addresses, they have different PPP link addresses. Thus, the packets can be correctly routed to and from the mobile nodes by maintaining a table such as illustrated in FIG. 2 and using the table to either identify the proper PPP link for the home agent (for traffic destined for the mobile node), or to identify the proper home agent for the mobile node (for traffic received from the mobile node and destined for the host computer on the home network).

Thus, in the forward direction, and with reference to FIG. 4, an IP packet is received by the foreign agent through the IP tunnel from the home agent at step 76. The packet is decapsulated at step 78. The PPP link to forward the packet to is identified at step 80 by the outer source of the IP datagram (i.e., the home agent IP address), and the inner destination address in the datagram (i.e., the home network IP address of the mobile node). The foreign agent refers to the table of FIG. 2 to determine the PPP link to send the packet to There is no IP routing performed in this case. The packet is forwarded at step 82 to the proper PPP link. The foreign agent then waits for another packet from the home agent at step 84 and repeats steps 76, 78, 80 and 82 for subsequent packets. Of course, this process is running in parallel in the foreign agent for all the active ports and registered mobile nodes.

In the opposite direction, and with reference to FIG. 3, a packet is received from the mobile node at step 90. The packets received via each PPP link in the foreign agent is encapsulated at step 92 in accordance with the mobile IP protocol and tunneled to the proper home agent at step 94. The tunneling table of FIG. 2 is used to generate the tunneling information based on the unique set of mobile node home network IP address and PPP link address to arrive at the proper home agent IP address for tunneling the packet to the home agent.

In accordance with this method, multiple wireless nodes having the same home IP addresses but different home agent IP address may be distinguished from each other in the tunneling table and proper routing in both directions can be performed.

In the preferred embodiment, the foreign agent comprises a remote access server having a plurality of ports (such as 24, 48, or even 200 or more in a high density embodiment). The remote access server is provided with appropriate software and hardware for establishing a PPP link with a wireless node at each port. Each port has its own PPP link address. Further, the table shown in FIG. 2 is increased, to provide routing information for all the PPP link addresses associated with the ports.

From the forgoing, it will be appreciated that we have described an improvement to a foreign agent for a plurality of wireless nodes, in which the improvement comprises providing a software program in the foreign agent for handing routing of packets through the foreign agent for the plurality of wireless nodes having a common or overlapping home network address. The software program will typically run on either a routing card or general purpose computing platform incorporated into the foreign agent. Typically, the routing card or computing platform provides an interface between the foreign agent and a local or wide area IP network. The software program comprising a set of instructions:

(a) maintaining a table (such as shown in FIG. 2) uniquely identifying links (that connect the foreign agent to the plurality of wireless nodes) to home agent addresses and home network addresses for the wireless nodes; and (b) associating packets to be transmitted to the wireless nodes by the uniquely identified links.

Accordingly, and as explained above, wireless nodes having the same home network addresses but different home agent addresses may be distinguished from each other in the table and proper routing of packets through the foreign agent to or from the wireless nodes may be achieved. Persons skilled in the art and familiar with mobile IP data networking and foreign agents will be able to code such software instructions from the present description without undue difficulty. For example, the instructions may encode the procedure shown in FIGS. 3 and 4. The procedures for establishing PPP links with mobile nodes and registering of mobile nodes with a foreign agent, are known in the art and described in the mobile IP data networking literature.

Persons skilled in the art will appreciate that various modifications and alterations, from the presently preferred embodiment can be made without departure from the true scope and spirit of the invention. This true scope and spirit is defined by the appended claims, to be interpreted in light of the foregoing.

We claim:

1. A method of routing a data packet through a foreign agent to a wireless node, comprising the steps of:

receiving said data packet at said foreign agent from a home agent associated with said wireless node;

associating, in said foreign agent, a home Internet Protocol (EP) address and a home agent IP address contained in said data packet with a Point-to-Point Protocol (PPP) link address, said PPP link address associated with a PPP link established between said foreign agent and said wireless node; and forwarding said data packet through said foreign agent to said PPP link for transmission to said wireless node.

2. The method of claim 1, wherein said foreign agent maintains a table mapping PPP link addresses to unique pairs of home IP addresses and home agent IP addresses, and wherein said step of associating is performed automatically in said foreign agent by reference to said table, whereby multiple wireless nodes having the same home IP addresses but different home agent IP address may be distinguished from each other in said table.

3. The method of claim 2, wherein said foreign agent comprises a remote access server having a plurality of ports, each port for establishing a PPP link with a wireless node.

4. In a foreign agent for a plurality of wireless nodes, an improvement comprising:

providing a software program in said foreign agent for handing routing of packets through said foreign agent for said plurality of wireless nodes having a common home network address, said software program comprising a set of instructions:

(a) maintaining a table uniquely identifying links that connect said foreign agent to said plurality of wireless nodes to home agent addresses and home network addresses for said wireless nodes; and (b) associating packets to be transmitted to said plurality of wireless nodes to the uniquely identified links, whereby wireless nodes having the same home network addresses but different home agent addresses may be distinguished from each other in said table and proper routing of packets through said foreign agent to or from said wireless nodes may be achieved.

5. The improvement of claim 4, wherein said table comprises a tunneling table, said tunneling table comprising a plurality of entries, each of said entries corresponding to a respective wireless node of said plurality of wireless node, wherein each of said entries comprises:

a PPP link address;

a home agent Internet protocol (IP) address; and a home IP address.

6. The improvement of claim 4, wherein said set of instructions comprises:

establishing a point-to-point protocol (PPP) link between a foreign agent (FA) and a respective wireless node of said plurality of wireless nodes;

registering said respective wireless node with said FA;

creating an entry in said table, the entry comprising:
a PPP link address
a FA Internet protocol (IP) address; and
a home IP address;

receiving a data packet from said respective wireless node at said FA;

encapsulating said packet;

forwarding said packet to a home agent.

7. The improvement of claim 4, wherein said set of instructions are executed by a routing card providing an interface between said foreign agent and an Internet Protocol (IP) network.

8. The improvement of claim 4, wherein said foreign agent comprises a remote access server.

9. The improvement of claim 8, wherein said remote access server provides at least 24 ports capable of establishing PPP links with at least 24 wireless mobile nodes, and wherein each of said PPP links is uniquely identified in said table.

10. The improvement of claim 8, wherein said home agent address comprises a home agent Internet Protocol (IP) address, wherein said home network address comprises a home IP address, and wherein said link is uniquely identified by a Point-to-Point Protocol (PPP) link address.

11. A method of routing a data packet through a foreign agent to a mobile wireless node, comprising the steps of:

establishing a Point-to-Point Protocol (PPP) link between said foreign agent and said node, said PPP link having a PPP link address;

processing a registration request message from said node and registering said node;

storing in a table a home agent Internet Protocol (IP) address for a home agent for said node, a home IP address for said node, and a PPP link address for said node; said home Agent IP address and said home IP address uniquely associated with said PPP link address in said table;

receiving a packet from said home agent;

decapsulating said packet; and forwarding said packet to said PPP link, said step of forwarding performed by reference to said table.

12. A method of routing a data packet through a foreign agent from a wireless node to a home agent, comprising the steps of:

establishing a Point-to-Point Protocol (PPP) link between said foreign agent and said node, said PPP link having a PPP link address;

processing a registration request message from said node and registering said node;

storing in a table a home agent Internet Protocol (IP) address for said home agent for said node, a home IP address for said node, and a PPP link address for said node, said home Agent IP address and said home IP address uniquely associated with said PPP link address in said table;

receiving a packet from said node via said PPP link;

encapsulating said packet; and forwarding said packet to said home agent, said step of forwarding performed by reference to said table to determine said home agent IP address from said PPP link address.

13. In a foreign agent for a plurality of wireless nodes, an improvement comprising:

providing a software program in said foreign agent for handling routing of packets through said foreign agent for said plurality of wireless nodes having a common home network address, said software program comprising a set of instructions:

(a) maintaining a table uniquely identifying links that connect said foreign agent to said plurality of wireless nodes to home agent addresses and home network addresses for said wireless nodes; and (b) associating packets received from said wireless nodes at said foreign agent to home agents for said wireless nodes, whereby multiple wireless nodes having the same home network addresses but different home agent addresses may be distinguished from each other in said table and proper routing of packets through said foreign agent to said home agents may be achieved.

14. The improvement of claim 13, wherein said table comprises a tunneling table, said tunneling table comprising a plurality of entries, each of said entries corresponding to a respective wireless node of said plurality of wireless node, wherein each of said entries comprises:

a PPP link address;

a home agent Internet protocol (IP) address; and a home EP address.

15. The improvement of claim 13, wherein said set of instructions comprises:

establishing a point-to-point protocol (PPP) link between a foreign agent (FA) and a respective wireless node of said plurality of wireless nodes;

registering said respective wireless node with said FA;

creating an entry in said table, the entry comprising:
a PPP link address;
a FA Internet protocol (IP) address; and
a home IP address;

receiving a packet from a home agent at said FA, said packet being for delivery to said respective wireless node;

decapsulating said packet to obtain an IP datagram;

forwarding said packet to said respective wireless node based on a comparison of said datagram with said entry in said table.

* * * * *

UNITED STATES PATENT AND TRADEMARK OFFICE
CERTIFICATE OF CORRECTION

PATENT NO. : 6,684,256 B1
DATED : January 27, 2004
INVENTOR(S) : Chandra Warrier and Yingchun Xu It is certified that error appears in the above-identified patent and that said Letters Patent is hereby corrected as shown below:

Column 6,
Line 24, please delete "(EP)" and substitute -- (IP) --

Column 8,
Line 40, please delete "EP" and substitute -- IP --

Signed and Sealed this

Fifteenth Day of June, 2004

JON W. DUDAS
*Acting Director of the United States Patent and Trademark Office*